United States Patent [19]

Albrecht

[11] Patent Number: 4,712,828
[45] Date of Patent: Dec. 15, 1987

[54] CONVERTIBLE TOP APPARATUS FOR MIDENGINE AUTOMOBILES

[75] Inventor: Leonard N. Albrecht, Irvine, Calif.

[73] Assignee: California Auto Trends, Irvine, Calif.

[21] Appl. No.: 796,074

[22] Filed: Nov. 7, 1985

[51] Int. Cl.⁴ ................................................ B60J 7/12
[52] U.S. Cl. ..................................... 296/121; 296/76; 296/107; 296/124; 29/401.1; 16/348; 16/361; 16/365
[58] Field of Search ........ 296/107, 108, 116, 121–124, 296/131, 132, 76, 186; 29/401.1, 407; 180/69.21; 16/360, 361, 365, 366, 348

[56] References Cited

U.S. PATENT DOCUMENTS

| | | | |
|---|---|---|---|
| 2,800,361 | 7/1957 | Kubacka | 296/107 X |
| 3,278,221 | 10/1966 | Jaulmes | 296/107 X |
| 3,298,733 | 1/1967 | Kerby et al. | 296/108 |
| 4,438,971 | 3/1984 | Zaydel | 296/31 P X |
| 4,566,728 | 1/1986 | Theodore | 296/146 X |

FOREIGN PATENT DOCUMENTS 1430450 11/1968 Fed. Rep. of Germany ...... 296/107

*Primary Examiner*—Dennis H. Pedder
*Attorney, Agent, or Firm*—Allan R. Fowler

[57] ABSTRACT

Convertible top apparatus for midengine automobiles, such as the Pontiac Fiero and Toyota MR2, which have a far forwardly extending rear deck lid for accessing the engine, comprises a foldable frame assembly, a pliable top covering for the frame and means for pivotally mounting the frame assembly to the automobile body, for example, after the factory installed hard top is removed, forwardly of the forward end of the rear deck lid. The frame assembly is configured so that rearward portions of the top extend rearwardly over the deck lid when the top is up, portions of the frame assembly stacking on top of forward regions of the rear deck when the top is down. The frame mounting means include mounting brackets fixed to the automobile and hinge members pivotally mounted to the brackets and to which both the deck lid and top frame assembly are connected. The brackets and hinge members are configured so that with the top up, opening the deck lid also pivots up rearward portions of the top. Overlapping slots in the brackets and hinge members enable portions of the folded frame assembly to move in response to opening the deck lid so that the frame is not caused to unfold when the deck lid is opened.

20 Claims, 10 Drawing Figures

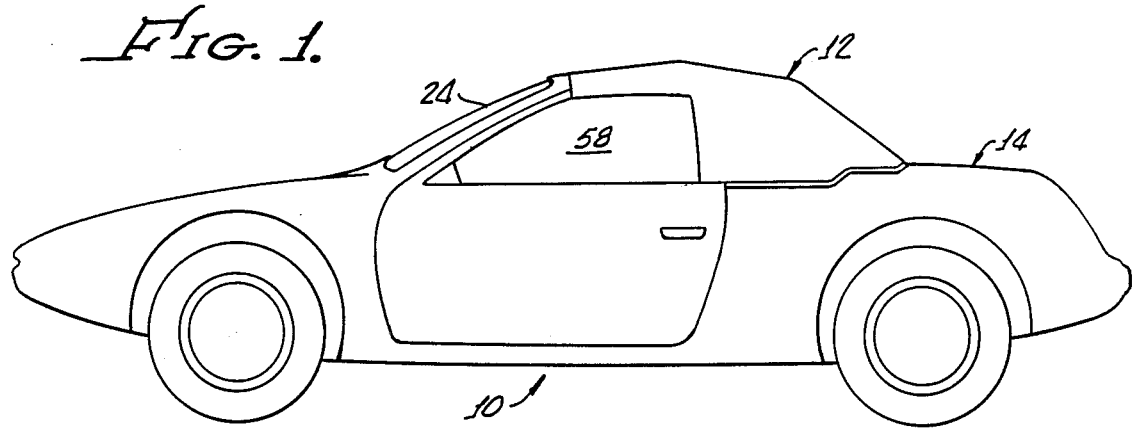
Fig. 1.
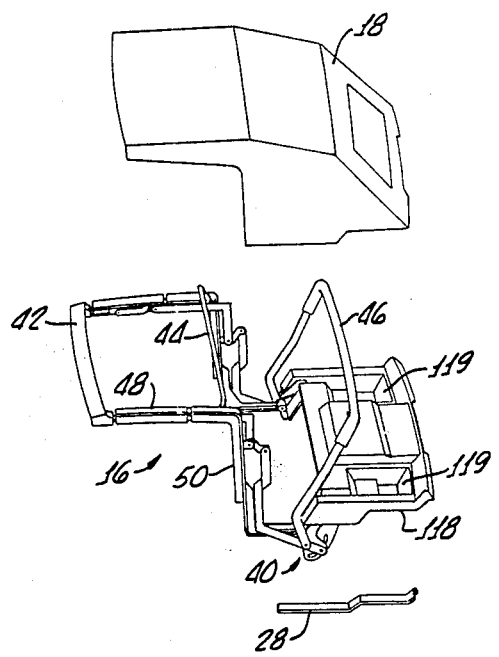
Fig. 2.
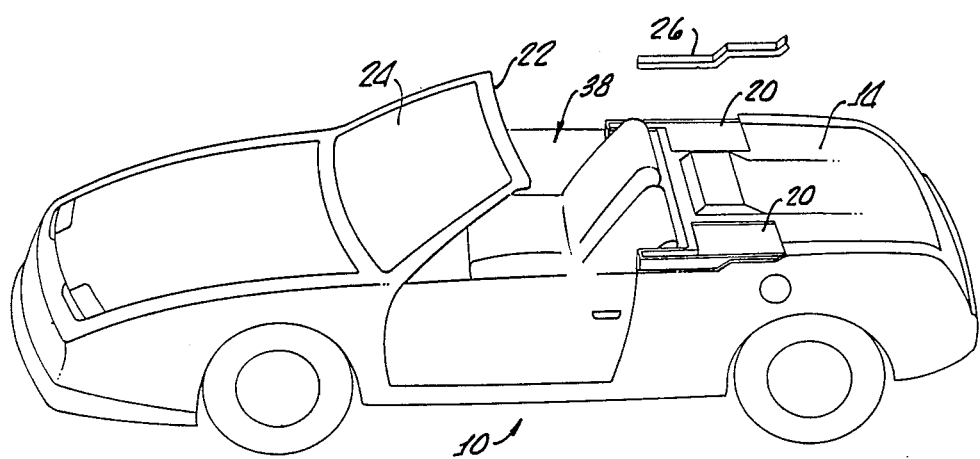

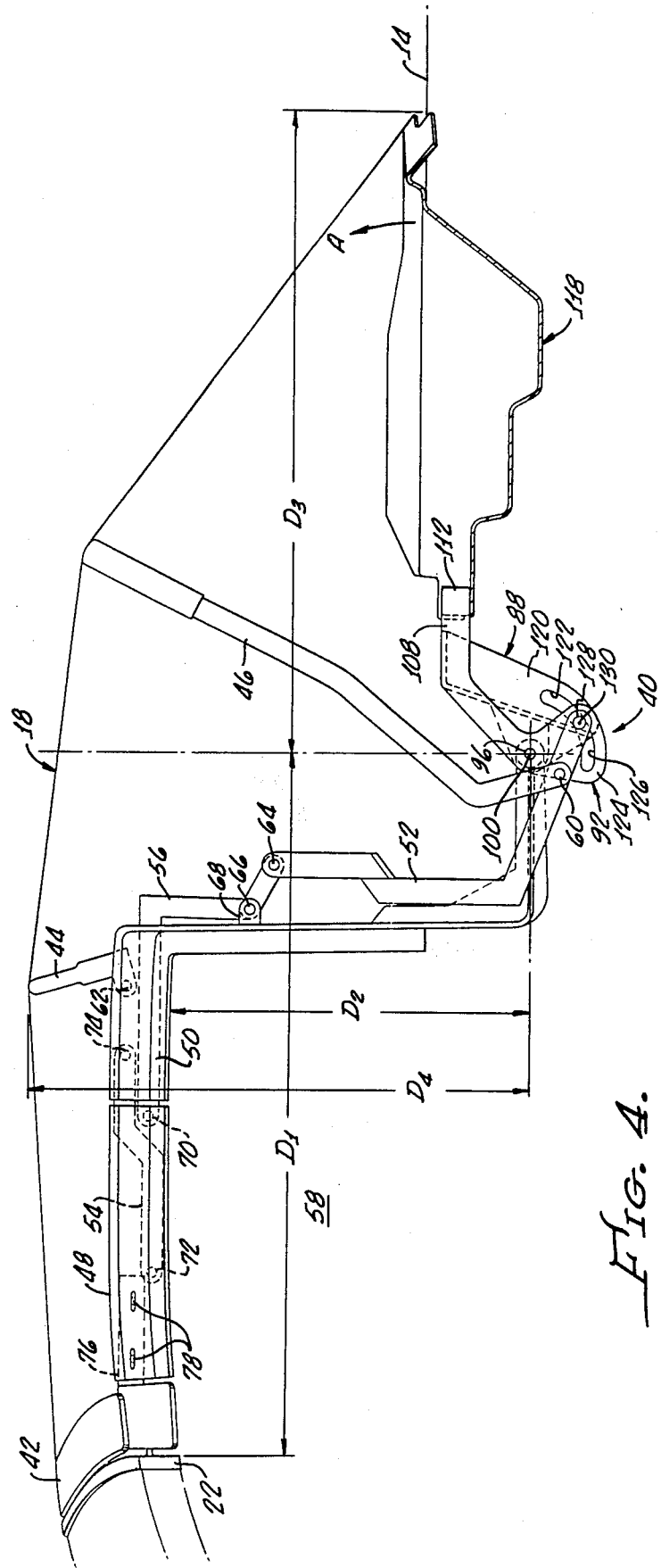

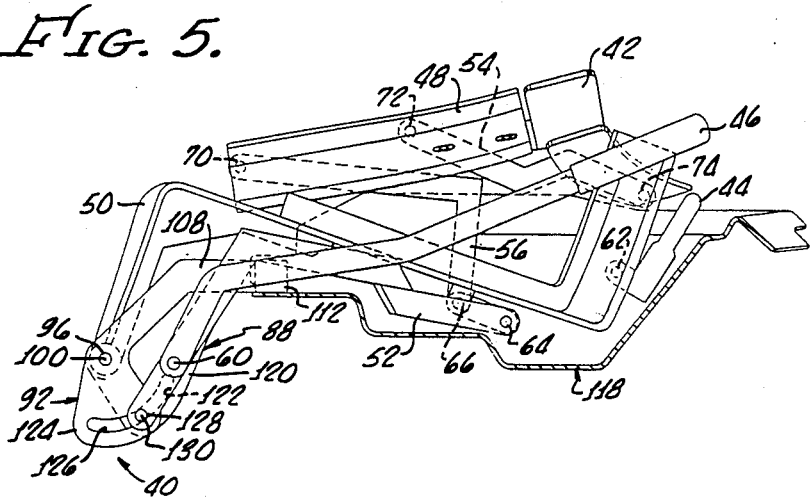
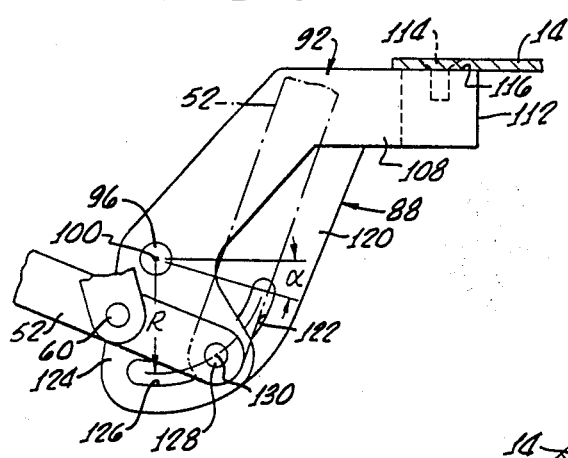
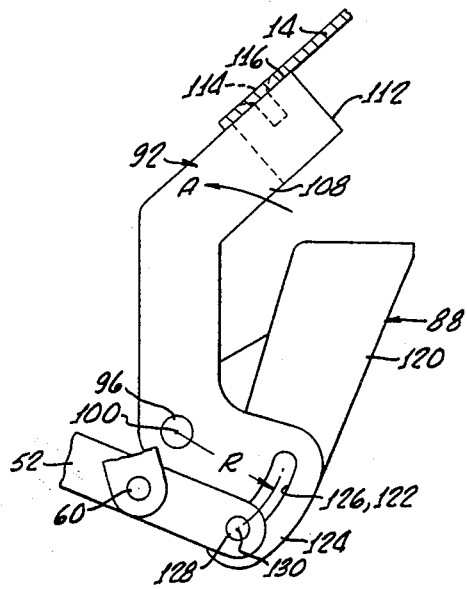
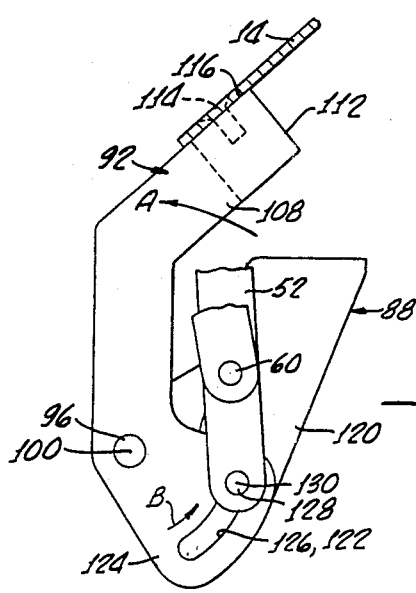

CONVERTIBLE TOP APPARATUS FOR MIDENGINE AUTOMOBILES

BACKGROUND OF THE INVENTION

1. Field of the Invention

The present invention relates generally to the field of convertible tops for automobiles and more particularly to the field of convertible top conversions for modern, midengine sports-type cars.

2. Discussion of the Prior Art

Convertible automobiles (convertibles) have always been popular with certain segments of the driving public. And until about the mid 1970's all of the major United States automobile manufacturers produced factory-made convertibles in at least some of their automobile product lines. Because these factory-built convertibles were manufactured on the automotive companies' production lines as variations of hardtop models, the cost to buyers of convertibles was usually not substantially greater than that of comparably equipped, hardtop automobiles of the same model type.

However, as automobile air conditioning became more common and as national safety standards relating to roll-over strength of automobiles became more stringent, the factory production in this country of convertibles was gradually phased out and was completely stopped in about 1978. New convertibles were then available only in some few types of imported automobiles, notably in expensive foreign sports cars, and in relatively costly, customized conversions of small foreign and domestic hardtop automobiles.

The fascination of many motorists with convertibles did not, however, die with the ending of domestic convertible manufacturing. To the contrary, the unavailability of new, factory-built convertibles seemed to enhance or revive public interest in convertibles and older, factory-produced convertibles became sought after, often as collectors' items. Such used convertibles tended to increase, rather than to decrease, in value and the reconditioning, by specialty shops, of certain popular models of convertibles became a profitable business.

As interest was regained in convertibles and as conversion of new hardtop automobiles into convertibles became more common and profitable, the major U.S. automobile manufacturers, in about 1982–1983, reintroduced convertible versions of some of their smaller, sporty models.

However, so far is known by the present inventors, none of the automobile manufacturers (except American Motors Corporation) providing, through their dealers, convertibles to buyers actually construct the convertibles on their own production lines. Instead, for such reasons as economy of manufacturing, considering the still comparatively small numbers of convertibles sold, most automobile manufacturers presently ship out, to special conversion facilities, completely manufactured hardtop automobiles. In these conversion facilities, the hardtop automobiles are converted by cutting the tops off, installing convertible top mechanisms and reinforcing the automobile frames to compensate for removal of the hardtops (which add to body rigidity).

Such convertible conversions, because requiring substantial structural modifications of the automobile being converted, have usually been time consuming and relatively costly, typically adding on the order of about $4,000, and in some instances, up to about $35,000 to the buyers' cost of the hardtop automobile used in the conversion.

Part of this high additional cost for convertibles, as compared to comparable hardtop automobiles, is attributable, under present conversion practices, to cutting off and discarding a significant part of the completely built automobile. Thus, the buyer not only pays the cost of a completely manufactured hardtop automobile, but also pays additionally for removing and throwing away part of the automobile. In contrast, so far as is known, previous factory-assembled convertibles were never first completely assembled as hardtops.

Another factor contributing to the present high cost differential between convertibles and comparable hardtops is that the automobiles being converted were neither designed nor constructed with convertible conversion specifically in mind. Thus, considerable difficulties are often encountered in effecting a satisfactory and attractive conversion. For example, a hardtop automobile may not provide sufficient space for a convertible top mechanism of economical design; specially complicated convertible top mechanisms, which are costly to manufacture, must, therefore, often be constructed. Additionally or alternatively, interior parts of the automobile being converted ordinarily must be cut away to provide space for accommodating or accessing the convertible top mechanism, thereby often requiring considerable reupholstery work. Moreover, because of access it is generally more costly to reinforce the existing frame of a converted automobile than it would be to reinforce the frame, or provide a more rigid frame, during automobile assembly.

Particular original design problems are associated with the conversion of several, currently popular midengine, hardtop automobiles to convertibles. These midengine automobiles, which include General Motors' Pontiac Fiero, Toyota's MR-2 and the out-of-production Porsche 914, do not, in fact, have the engine in the middle but rather position the engine forwardly of the rear axle and behind the driver's and passenger's compartment, such compartment being more or less at the longitudinal middle of the automobile.

In order to enable working access to the engine compartment of a so-called midengine automobile, rear deck lids (in effect engine hoods) covering the engine compartment opening typically extend forwardly, usually much further forward than the trunk lids of conventional, front engine automobiles or than the engine compartment deck lids of rear engine automobiles which have their engines more rearwardly positioned than those of midengine automobiles.

Thus, midengine rear deck lids, which are typically hinged at their forward ends, extend to closely behind the driver's seat. Accordingly, midengine automobiles are two seaters, although a small jump seat may be provided behind the driver's and passenger's seats. The rear windows of midengine automobiles are, as a consequence, located far forwardly, adjacent the forward edge of the rear deck lid, and are usually vertical, or nearly so, to conserve space.

It can be appreciated that with a long, forwardly extending rear deck, a short driver's and passenger's compartment and a vertical rear window separating the two, the body lines of midengine automobiles would not be expected to be very attractive or appealing to automobile buyers. As a result, the manufacturers, in effect, camouflage midengine automobiles by providing elongate, slender roof rear quarter panels or webs which extend rearwardly from the driver's and passenger's compartment along side edges of the rear deck lid. These roof rear quarter panels are generally triangular in shape and cause the roof line, as seen from the side, to closely resemble the roof lines of conventional, front engine two door hardtop automobiles. Additionally, the rear quarter panels may be constructed having recessed regions which appear to be, but usually are not, small windows. Ordinarily, the roof top projects at least slightly rearwardly over the rear window so that the relatively harsh verticle lines of the window are additionally obscured. As a result of such construction, the midengine automobiles are enabled to have long, forwardly hinged rear deck lids which provide good engine compartment access while at the same time are enabled to have a conventional, attractive roof line and roof appearance.

However, the rear window placement and forwardly extending rear deck lid make convertible conversion of such midengine automobiles difficult. On the one hand, fashioning the conversion convertible tops and related mechanism so the tops follow the line of midengine automobiles' rear window (eliminating the rearwardly extending roof quarter panels), to thereby locate the convertible top completely forwardly of the rear deck lid and thereby permit unimpeded opening thereof would result in unattractive, box-shaped tops. Moreover, because the rear windows of such midengine automobiles are so close to the driver's seat, the associated convertible top wells would necessarily intrude excessively into the seating compartment. On the other hand, fashioning the convertible tops to follow the hardtop roof line defined in part by the above-mentioned rear roof quarter panels, so that the convertible conversion looks similar to the unconverted hardtop, would cause rearward regions of the convertible top to extend a substantial distance rearwardly over the rear deck lid. As a result of extending rearwardly over forward regions of the rear deck lid, difficulties would be expected to be encountered in opening the rear deck lid to access the engine compartment.

It is, therefore, an object of the present invention to provide a convertible top mechanism for midengine automobiles which enables the convertible top to extend rearwardly over the rear deck lid while permitting substantially normal opening operation of the rear deck lid.

Another object of the present invention is to provide a convertible top mechanism for midengine automobiles which enables the convertible top to extend rearwardly over forward regions of the rear deck lid and which enables the rear deck lid to be opened, with the convertible top either up or down, without disengaging the top from the automobile.

Additional objects, advantages and features of the present invention will become apparent to those skilled in the art from the following description taken in conjunction with the accompanying drawings.

SUMMARY OF THE INVENTION

According to the present invention, convertible top apparatus is provided for midengine automobiles which have a forwardly extending engine compartment access opening and a forwardly extending rear deck lid for the covering thereof. Comprising the convertible top apparatus are a convertible top frame assembly configured for being foldable from an extended condition to a collapsed condition and unfoldable from the collapsed condition to the extended condition, a fabric convertible top covering configured for fitting over the top frame assembly when the assembly is in the extended condition, and means for connecting the top covering to the frame assembly. Included in the apparatus are means for pivotally mounting forward regions of the rear deck lid to the automobile for pivotal movement of the deck lid between a closed condition in which the engine compartment access opening is closed and an open position in which the opening is uncovered, and means for mounting the top frame assembly to the automobile in a location causing rearward portions of the frame assembly and the top covering to extend rearwardly a substantial distance over forward portions of the rear deck lid. The frame assembly mounting means are configured for enabling the rear deck lid to be pivoted from the closed position to the open position without requiring detachment of the top covering from the frame assembly regardless of whether the frame assembly is in the extended condition or the collapsed condition when the deck lid is opened.

Preferably, the frame mounting means are also configured for enabling the rear deck lid to be pivoted from the closed position to the open position when the frame assembly is in the collapsed condition without causing any substantial unfolding of the frame assembly.

In an embodiment of the invention, the deck lid mounting means comprise a mounting bracket and means connecting the bracket to the automobile forwardly of the engine compartment access opening and further comprise a deck lid hinge and means connecting the hinge to forward regions of the deck lid and still further include means for pivotally mounting the deck lid hinge to the mounting bracket so as to define a transverse deck lid pivotal axis. It is preferred that the deck lid mounting means comprise a left-hand and a right-hand mounting bracket and a left-hand and a right-hand deck lid hinge, the pivotal mounting means mounting the left-hand hinge to the left-hand bracket and the right-hand hinge to the right-hand bracket.

The frame assembly may include a left-hand and a right-hand rearward rail and a left-hand and a right-hand control arm. The means for mounting the top frame assembly to the automobile preferably include means for connecting the rearward rails to the deck lid mounting brackets for pivotal movement of the rails about the transverse deck lid pivotal axis, means defining a first, arcuate slot in each of the left-hand and right-hand deck lid hinges and means defnining a second, arcuate slot in each of the left-hand and right-hand mounting brackets. In such case, it is preferred that both of the first slots and both of the second slots have the same slot width and are located at a same radius, R, from the transverse deck lid pivotal axis and are positioned so that rearward ends of the first slots overlap forward ends of the second slots by about one slot width when the deck lid is in the closed position and so that the first slots substantially overlap the second slots when the deck lid is in the open position. The means for mounting the frame assembly to the automobile preferably includes a left-hand pivot pin extending through both the respective first and second slots of the left-hand deck lid hinge and the left-hand mounting bracket and a right-hand pivot pin extending through both the respective first and second slots of the right-hand deck lid hinge and the right-hand mounting bracket. Means are provided for connecting a rearward end region of the left-hand control arm to the left-hand pivot pin and for connecting rearward end regions of the right-hand control arm to the right-hand pivot pin, the first and second pivot pins through the slots defining a transverse control arm pivot axis.

In the preferred configuration, the first and second left-hand slots are configured so as to cause, when the deck lid is in the closed position, the left-hand control arm pivot pin to be restrained against movement between a rearward end of the first left-hand slot and a forward end of the second left-hand slot and wherein the first and second right-hand slots are configured so as to cause, when the deck lid is in the closed position, the right-hand, control arm pivot pin to be non-slidably confined between a rearward end of the first right-hand slot and a forward end of the second right-hand slot.

Moreover, the first and second left-hand slots are preferably located and configured so as to cause the two left-hand slots to substantially overlap one another and the first and second right-hand slots are located and configured so as to cause the two right-hand slots to substantially overlap one another when the deck lid is in the open position. Thereby when the frame assembly is in the collapsed condition and the deck lid is pivoted between the closed and open position, the left-hand control arm pivot pin is enabled to slide along the overlapped left-hand slots and the right-hand control arm pivot pin is enabled to slide along the overlapped right-hand slots in a manner enabling forward pivoting of the collapsed frame assembly as required for opening of the deck lid without unfolding of the frame assembly.

More particularly, in the preferred case, the frame assembly is configured so that when the frame assembly is in the collapsed condition and the deck lid is pivoted from the closed position to the open position, the left-hand control arm pivot pin slides rearwardly and upwardly in the overlapped first and second left-hand slots and the right-hand control arm pivot pin slides rearwardly and upwardly in the overlapped first and second right-hand slots in a manner enabling the frame assembly to remain in the collapsed condition against the deck lid.

The frame assembly desirably includes a transverse main top bow and means for pivotally connecting a lower left-hand end of the bow to the left-hand control arm forwardly of the left-hand pivot pin and for pivotally connecting a lower right-hand end of said bow to the right-hand control arm forwardly of the right-hand pivot pin. An axis through the left-hand and right-hand connection points between the bow and the control arms defines a transverse, main bow pivotal axis. Further, the convertible top frame assembly may include a transverse, shelf member and means for connecting forward regions thereof to the rear deck pivotal mounting means and for connecting rearward regions of the convertible top covering to rearward regions of the shelf.

There may further be included in the top frame assembly left-hand forward and rearward rails and right-hand forward and rearward rails, a rearward end of the left-hand rearward rail being connected at the left-hand deck lid hinge for pivoting about the transverse, fixed hinge axis and a rearward end of the right-hand rearward rail being connected at the right-hand deck lid hinge for pivoting about the transverse, fixed hinge axis. Further included may be means pivotally interconnecting the left-hand forward and rearward rails and pivotally interconnecting the right-hand forward and rearward rails so as to cause the left-hand forward rail and the right-hand forward rail to pivot respectively relative to the left-hand and the right-hand rearward rails when the top assembly is folded from the extended condition to the collapsed condition. The means pivotally interconnecting the left-hand forward and rearward rails include a left-hand rearward control link and a left-hand forward control link and the means pivotally interconnecting the right-hand forward and rearward rails include a right-hand rearward control link and a right-hand forward control link, the left-hand rearward control link being pivotally connected to the left-hand control arm and the right-hand rearward control link being pivotally connected to the right-hand control arm.

BRIEF DESCRIPTION OF THE DRAWINGS

A better understanding of the present invention may be had from a consideration of the following detailed description, taken in conjunction with the accompanying drawings in which:

FIG. 1 is a side view of an exemplary, Fiero midengine automobile showing the convertible top apparatus of the present invention installed in place of the preexisting hardtop;

FIG. 2 is a perspective drawing the an exemplary, Fiero midengine automobile upon which is installed a convertible top apparatus according to the present invention, the top assembly being shown exploded from the automobile to show features of the top assembly;

FIG. 4 is a side elevational view of the frame assembly of the convertible top apparatus of FIG. 1, showing construction of the frame assembly and showing the frame assembly in its fully extended condition, and with the automobile rear deck lid closed;

FIG. 5 is a side elevational view of the frame assembly showing the frame assembly in the fully collapsed or stowed condition and with the automobile rear deck lid closed and showing, in phantom lines the condition of the frame assembly when the rear deck lid is open; and, FIG. 6 is a series of drawings showing relative positions of the deck lid hinges, mounting brackets, control arm, and main control arm hinge point, various combinations of the frame assembly and deck lid positions;

FIG. 6(a) showing the relative positions for the hinges, brackets, and main control arm hinge point, with the deck lid down, the frame assembly extended and, in phantom lines, the frame assembly collapsed;

FIG. 6(b) showing the relative positions of the hinges, brackets and main frame hinge point with the frame assembly extended and the deck lid open; and, FIG. 6(c) showing the relative positions of the hinges, brackets and main control arm hinge points with the frame assembly collapsed and the deck lid open.

DESCRIPTION OF THE PREFERRED EMBODIMENT

Figure 3:
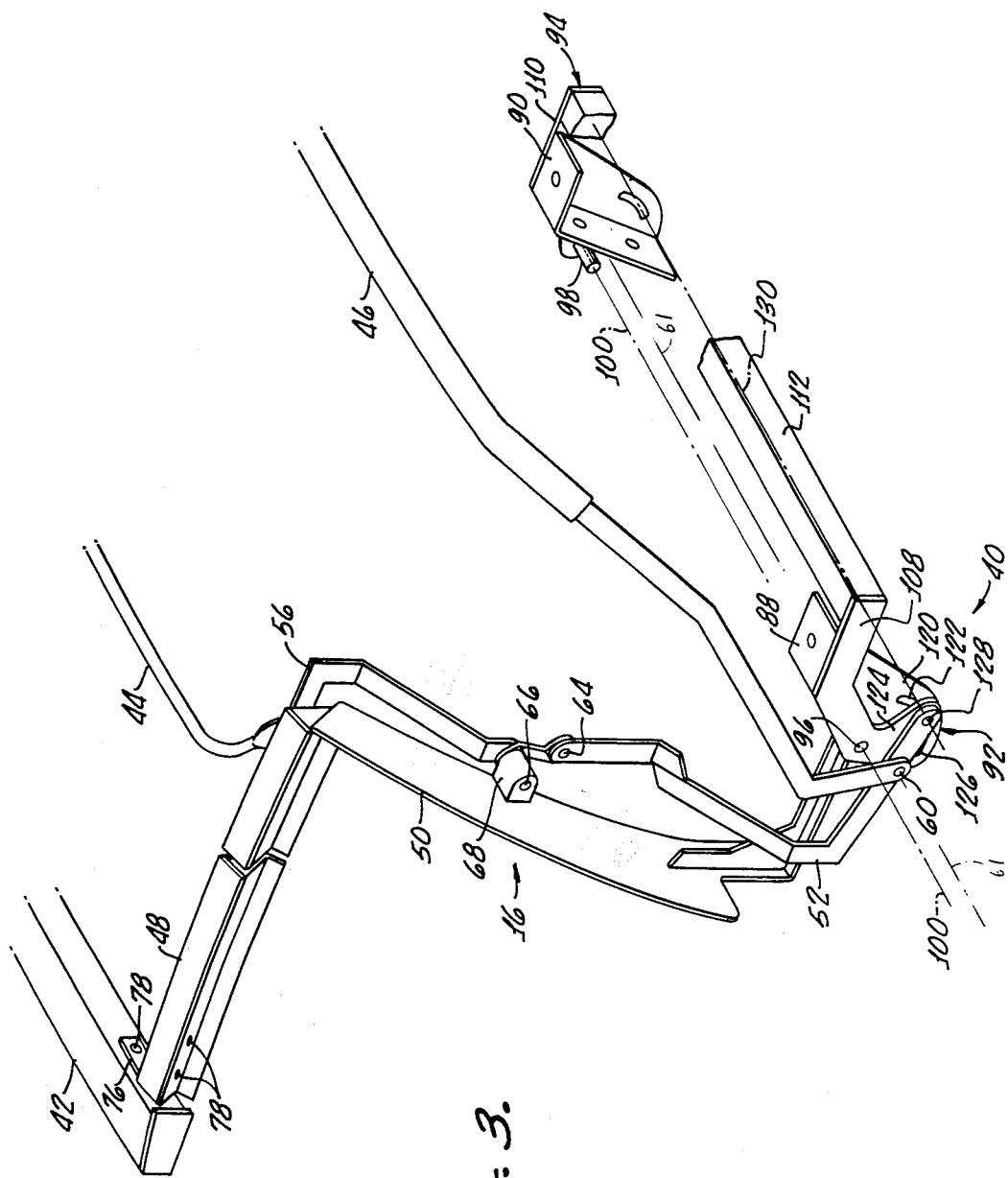
FIG. 3 is a partial perspective drawing showing one side of the convertible top frame assembly.
Figure 7:
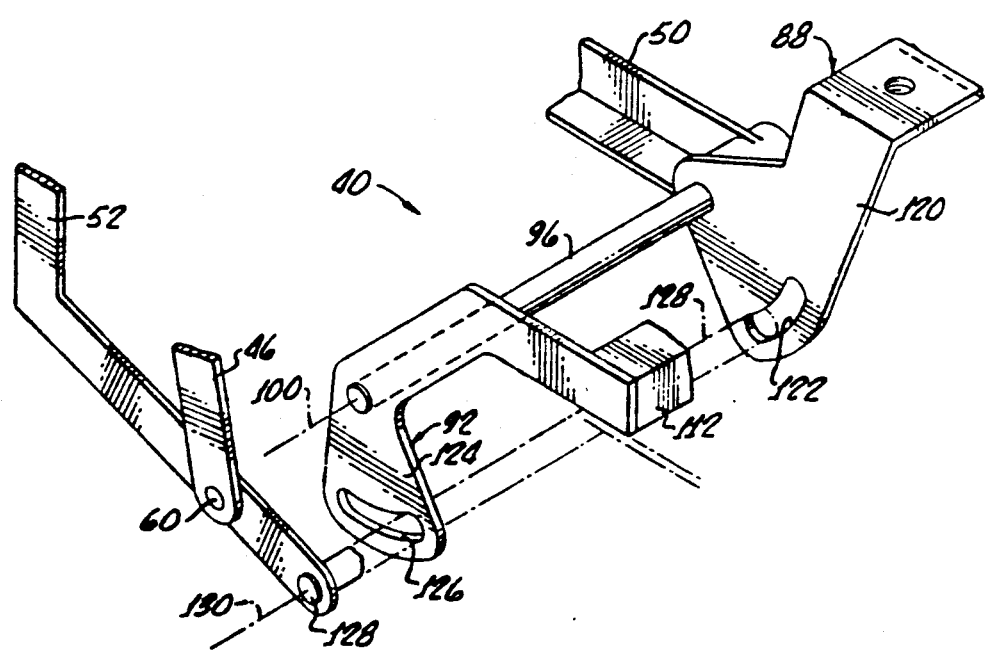
FIG. 7 is an exploded view of the overlapping slots of the left-hand mounting bracket.

There is shown in FIG. 1 a converted exemplary midengine automobile 10 with which the convertible top apparatus 12 of the present invention may be used to advantage. By way of illustrative example, and with no limitation thereto being intended or implied, automobile 10 is depicted as a Pontiac Motor's Fiero 2M4 or 2M6 (four or six cylinder engine model). As can be seen, and as more particularly described below, convertible top apparatus 12 extends rearwardly over a rear deck lid or engine cover 14.

As shown in FIG. 2, convertible top apparatus 12 comprises generally a top frame assembly 16 and a pliable, fabric top 18 shaped to fit tautly over the frame assembly. Automobile 10 is converted, by removing the factory assembled hard top portion, as well as other portions of the automobile in areas upon which top apparatus 12 of the present invention is installed. Conversion of automobile 10 to accept convertible top apparatus 12 may be accomplished in the manner disclosed and described in our copending U.S. patent application Ser. No. 796,072 filed on 11/7/85, which is incorporated in its entirety hereinto by specific reference.

In general, and as disclosed in such copending application, well regions 20 are defined in automobile 10 in the region of rear deck lid 14. A windshield header 22 is installed along the top of windshield 24 to finish framing the windshield in regions where the original, factory installed hard top is cut away and to provide convertible top latching (not shown) of a generally conventional type. Associated with convertible top apparatus 12 may be power actuating apparatus (not shown) of a generally conventional electric or hydraulic type, as is well known by those skilled in the automotive, convertible top art, and which forms no part of the present invention.

Further shown in FIG. 2 are left and right-hand side panel trim strips 26 and 28 which, as described in our above-cited copending application, cover cut edges of automobile 10 which are exposed after removal of the hard top.

In general, top frame assembly 16 is constructed similarly to preexisting known convertible top frame assemblies. The function of the frame assembly is, of course, to enable folding of convertible top 18 from the fully extended condition depicted in FIGS. 1 and 2, in which an occupant (driver and passenger) seating region 38 of automobile 10 is covered and a fully folded or collapsed condition in which the top is folded down behind the occupant seating region and such region is completely exposed.

As more particularly described below, convertible top frame assembly 16 and means 40 for the mounting thereof to automobile 10 (FIGS. 2–6) are configured so that automobile rear deck lid 14, over forward regions of which top apparatus 12 rearwardly extends, can be opened, for engine access, whether the top apparatus is in the extended, up condition or the folded, down condition, without the necessity for disconnecting any part of the apparatus from the automobile. Moreover, top frame assembly 16 and mounting means 40 are configured so that with top apparatus 12 folded down, rear deck lid 14 can be opened to access the automobile engine without causing the unfolding of top frame assembly 16. That is, when the deck lid is opened, with the frame assembly 16 folded down, the frame assembly remains folded down. This feature is especially important when the folded-down top apparatus 12 is covered by a conventional convertible top boot (not shown). Otherwise, removal of the boot would be required before the rear deck lid could be opened and the boot would have to be reinstalled after the deck lid was closed.

More specifically, top frame assembly 16 comprises a transverse, arcuate top header 42 (FIGS. 3–5), a first, forward, transverse tack bow 44 and a second, rearward or main transverse tack bow 46. Comprising a left-hand (driver's) side of frame assembly 16, and interconnecting left-hand ends of header 42 and tack bows 44 and 46, are a comparatively short, forward rail 48, a comparatively long, angular rearward rail 50, a control arm 52 and respective forward and rearward control links 54 and 56. Forward and rearward rails 48 and 50 collectively frame the top and rear edge of left-hand window area 58 (FIG. 1).

Left-hand end regions of main tack bow 46 are pivotally connected, by a pivot pin 60, to rearwardly extending lower end regions of control arm 52. A transverse, main bow pivotal axis 61 is formed by the transverse line through the center of the pivot pin 60. A pivot pin 62 pivotally connects left-hand end regions of forward tack bow 44 to upper, forward end regions of rearward rail 50 (FIG. 4). A rearward end of rearward control link 56 is pivotally connected, by a pivot pin 64, to upper end regions of control arm 52, and is adjacently connected by a pivot pin 66 to a rearwardly projecting ear 68 of rearward rail 50. A forward end of rearward control link 56 is pivotally connected, by a pivot pin 70, to rearward end regions of forward rail 48 (FIG. 4).

In turn, a forward end of forward control link 54 is pivotally connected to mid regions of forward rail 48 by a pivot pin 72, and a rearward end of such control link is pivotally connected, by a pivot pin 74, to forward regions of rearward rail 50 (FIG. 4). A left-hand, angular bracket 76 is provided for adjustably interconnecting a forward end of forward rail 48 with a left-hand end of top header 42, screws 78 being used to connect the bracket to the header and forward rail.

The right-hand (passenger's) side of top frame assembly 16 is constructed having frame members which are mirror images of the above-described left-hand side members. Likewise, the right-hand members are interconnected with one another and with header 42 and tack bows 44 and 46 as described for the left-hand side members. Top frame 16 is thus symmetrical about a longitudinal vertical centerline plane through automobile 10.

To the extent described above, top frame assembly is generally conventional in configuration, being articulated in a manner enabling compact folding of the top apparatus (FIG. 5) from the fully extended, up position (FIGS. 1–4). As will be understood, configuration of the various frame assembly members described and depicted in the Figures, may vary according to the type of automobile 10 for which convertible top apparatus 12 is intended, and it is within the skill of those experienced in constructing and installing convertible tops to determine such configuration.

Comprising mounting means 40 are left-hand and right-hand mounting brackets 88 and 90, respectively (FIG. 3). Brackets 88 and 90 are fixed to the structure of the automobile forwardly adjacent to forward regions of rear deck lid 14 and are laterally spaced apart a distance about equal to width of the deck lid. Associated with left-hand mounting bracket 88 is a left-hand deck lid hinge member 92, a right-hand deck lid hinge member 94 being associated with right-hand mounting bracket 90.

Left-hand mounting bracket 88 and left-hand hinge member 92 are pivotally connected together by a left-hand, transverse pivot pin 96. Similarly, right-hand mounting bracket 90 and right-hand hinge member 94 are pivotally connected together by a right-hand, transverse pivot pin 98. Pivot pins 96 and 98 are symetrically positioned relative to top apparatus 12 so that axes of such pins lie on a common, transverse axis 100 which is the main, fixed transverse hinge axis.

A rearward end of left-hand rearward rail 50 is also pivotally connected to left-hand mounting bracket 88 and hinge member 92 by pivot pin 96. Similarly, a rearward end of the corresponding right-hand rearward rail (not specifically identified) is pivotally connected by pivot pin 98 to right-hand mounting bracket 90 and hinge member 94. Consequently, transverse axis 100 also constitutes a main pivotal axis for top frame assembly 16.

Left-hand and right-hand hinge members 92 and 94 are formed having respective, elongate, rearward extending arms 108 and 110 across ends of which is connected a rigid, transverse, deck lid mounting bar 112. Rearward edge regions of rear deck lid 14 are connected, for example, by a number of screws 114 (FIGS. 6a, 6b, and 6c) to an upper surface 116 of mounting bar 112 and thereby to hinge arms 108 and 110. Such connection of rear deck lid 14 to hinge members 92 and 94 and mounting bar 112 substitutes for conventional, factory hinged mounting of the deck lid to automobile structure, the original factory installed hinges being removed and discarded in the conversion process. Because of being mounted to bar 112 and hinge members 92 and 94, rear deck lid 14 also pivots between open and closed conditions on main transverse axis 100.

Completing frame assembly 16 is a comparatively wide, transverse rear frame member or package shelf 118 (FIGS. 2 and 4). Forward edge regions of package shelf 118 are fastened (as by screws, not shown) to transverse bar 112. After top 18 is attached to rearward portions of package shelf 118, such rearward regions are attached (as by other screws, not shown) to an upper surface of deck lid 14, substantially rearwardly of main hinge axis 100.

Package shelf 118 is preferably formed having left-hand and right-hand wells or recesses 119 into which other portions of frame assembly 16 are received when the frame assembly is folded to the fully collapsed condition. Upon installation of convertible top apparatus 12 upon automobile 10, package shelf wells 119 are recessed into corresponding well cutouts 20 made in deck lid 14 (FIG. 2).

Left-hand mounting bracket 88 is formed having a flat depending portion 120 in which is defined an arcuate slot 122 having its center of radius, R, at transverse axis 100. Similarly, left-hand hinge member 92 is formed having a flat, depending portion 124 in which is defined an arcuate slot 126 having the same slot width and radius as arcuate slot 122 and also having its center of radius, R, at transverse axis 100. (FIGS. 3-6). Corresponding arcuate slots (not specifically identified) are defined in right-hand mounting bracket 90 and hinge member 94.

As best shown in FIGS. 4 and 6(a), when deck lid 14 is in the closed position, a rearward end of left-hand mounting bracket slot 122 overlaps the forward end of left-hand hinge slot 126. The amount of such overlap of slots 122 and 126 is made, by slot length and position, to be equal to one slot width. Confined in this small, overlapped slot region when deck lid 14 is closed is a transverse pivot pin 128 to which a rearward end of control arm 52 is connected. A rearward end of the corresponding right-hand control arm is connected to a transverse pivot pin installed through overlapping regions of the slots formed in the right-hand mounting bracket 90 and hinge member 94. Axes of the left-hand pivot pin 128 and the corresponding right-hand pivot pin define a transverse, control arm pivoting axis 130.

It will be appreciated from the immediately foregoing description that when deck lid 14 is closed, left-hand pivot pin 128 is positionally locked between adjacent, overlapped ends of left-hand slots 122 and 126 and, correspondingly, the right-hand pivot pin is positionally locked between adjacent, overlapped ends of the right-hand mounting bracket and deck lid hinge slots. Accordingly, when deck lid 14 is in the closed condition, transverse control arm axis 130 is positionally fixed relative to main hinge axis 100.

With deck lid 14 closed, and hence with control arm axis 130 positionally fixed relative to main hinge axis 100, top assembly frame 16 folds up and down, between fully extended and fully collapsed conditions by pivoting about such axes in a generally conventional manner. But because package shelf 119 at all times extends rearwardly a substantial distance over forward regions of rear deck lid 14 and further because forward portions of frame assembly 16 extend into and onto the package shelf when the frame assembly is collapsed, problems could be associated with opening the deck lid without having to detach any portions of the frame assembly.

Left-hand mounting bracket and hinge member slots 122 and 126, and corresponding slots in right-hand bracket 90 and hinge member 94, however, enable these problems to be circumvented.

As is evident from FIGS. 3 and 4, and as particularly shown in FIGS. 6(b) and 6(c), as deck lid 14 is opened from the closed position (Arrow A), slots 122 and 126 in left-hand bracket 88 and hinge member 92 (and corresponding right-hand slots) increasingly overlap one another, thereby freeing left-hand pivot pin 128 and its right-hand counterpart to move in an arc of increasing length around fixed, main pivotal axis 100. Thus, control arm pivotal axis 130 no longer necessarily remains fixed relative to main pivotal axis 100. Preferably arcuate length of left-hand slots 122 and 126, as well as of corresponding right-hand slots are equal so that when deck lid 14 is fully open, the slots completely overlap one another.

When top frame assembly 16 is fully extended, so that top apparatus covers occupant compartment 38, at the time deck lid 14 is opened from the closed condition (FIG. 6(b)) there are no forces acting on components of the frame assembly which cause control arm axis 130 to move in left-hand slots 122 and 126 and in the corresponding right-hand slots. Accordingly, under such conditions when deck lid 14 is pivoted about axis 100, rearward portions of frame assembly 16, specifically package shelf 118 which is attached to the deck lid, are pivoted upwardly and forwardly (direction of Arrow A, FIG. 4). As package shelf 118 is pivoted in such a manner, portions of top 18 between the package shelf and main tack bow 46 fold. If deck lid 14 and shelf package 118 are pivoted sufficiently far open, the package shelf or folds in top 18 may cause main tack bow 46 to pivot (about left-hand pivot pin 60 and the counterpart right-hand pivot pin) upwardly and forwardly (also direction of Arrow A). As a result, portions of top 18 between tack bows 46 and 44 may slacken and fold.

However, the rest of top frame assembly 16 remains in the fully extended position and any mechanical loosening or disconnecting of any parts of top apparatus 12 is not required. As a result, with top apparatus 12 fully extended, deck lid 14 can be opened and closed at will without having to do anything with the top apparatus.

Ordinarily when top apparatus 12 is fully collapsed with the frame folded on top of package shelf 118 and deck lid 14, (FIG. 5) it would be expected that the opening deck lid would cause frame assembly 16 to start unfolding and such frame assembly unfolding would be caused if control arm axis 130 remained at all times positionally fixed relative to main pivotal axis 100.

Frame assembly 16 and left-hand mounting bracket and hinge member slots 122 and 126 and corresponding right-hand slots are configured so that when deck lid 14 is opened with top apparatus 12 (and specifically frame assembly 16) fully collapsed, left-hand control arm pivot pin 128 and the corresponding right-hand control arm pivot pin slide upwardly and rearwardly (direction of Arrow B, FIG. 6(c)) as the pairs of slots increasingly overlap one another. Such movement of left-hand pivot pin 128 in overlapping left-hand slots 122 and 126 and corresponding movement of the corresponding right-hand pivot pin in the right-hand slots is caused by upward and forward pivoting of folded frame assembly 16 when deck lid 14 is opened. The amount of resultant arcuate movement of control arm axis 130 is made sufficient to prevent any significant unfolding of top frame assembly 16 even when deck lid 14 is fully opened. Accordingly, removal of a top boot covering the folded top apparatus 12 is unnecessary, and deck lid 14 may be opened and closed, at will, with top apparatus 12 fully collapsed, and booted if desired, without having to detach any part of the apparatus from automobile 10.

EXAMPLE

By way of a specific example for convertible top apparatus 12 constructed for a Pontiac Fiero-type of automobile 10, the following approximate dimensions may be applied, although the invention is not limited thereto. Main hinge axis 100 may be located a horizontal distance, $D_1$, rearwardly from side edges of windshield header 22 equal to about 25 inches and a vertical distance, $D_2$, below upper, forwardly extending regions of rearward rail 50 (that is, below the top of window opening 58 in rearward regions thereof) which is about $12\frac{3}{4}$ inches (FIG. 4). Rearward portions of top apparatus 12 may extend a horizontal distance, $D_3$, rearwardly of axis 100 equal to about 23 inches, maximum vertical distance, $D_4$, of top covering 18 (at the break line over forward tack bow 44) above axis 100 may be about $17\frac{3}{4}$ inches. Left-hand mounting bracket and hinge member slots 122 and 126, as well as corresponding right-hand slots, may each be at a centerline radius, R, from axis 100 of about 2 inches and each slot may be about $2\frac{1}{4}$ long from end to end along the centerline of curvature; width of the slots may be about $\frac{3}{8}$ inches (FIG. 6(a)). The upper rearward end of mounting bracket slot 122 (and of the corresponding right-hand slot) may be at an angle, $\alpha$, below a horizontal plane through main hinge axis 100 of about 15 degrees.

Although there has been described above a specific arrangement of convertible top apparatus particularly adapted for installation of midengine automobiles in accordance with the present invention for purposes of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. Convertible top apparatus for midengine automobiles having a forwardly extending engine compartment access opening and a forwardly extending rear deck lid for covering said opening, the convertible top apparatus comprising:
    (a) a convertible top frame assemble configured for being foldable from an extended condition to a collapsed condition and unfoldable from the collapsed condition to the extended condition;
    (b) a fabric convertible top covering configured for fitting over the top frame assembly when said assembly is in the extended condition;
    (c) means for pivotally mounting forward regions of the rear deck lid to the automobile for pivotal movement of the deck lid between a closed condition in which the engine compartment access opening is closed and an open position in which said opening is uncovered; and
    (d) lost motion connection means for mounting the top frame assembly to said means for pivotally mounting enabling concurrent pivotal motion of the deck lid and retention of the respective condition of the frame assembly.

2. The convertible top apparatus as claimed in claim 1 wherein said frame mounting means are configured for enabling the rear deck lid to be pivoted from the closed position to the open position when the frame assembly is in the collapsed condition without causing any substantial unfolding of the frame assembly.

3. The convertible top apparatus as claimed in claim 1 wherein the deck lid mounting means comprise a mounting bracket located forwardly of the engine compartment access opening and further comprise a deck lid hinge and means connecting said hinge to forward regions of the deck lid and still further include means for pivotally mounting the deck lid hinge to the mounting bracket so as to define a transverse deck lid pivotal axis.

4. The convertible top apparatus as claimed in claim 3 wherein the deck lid mounting means comprise a left-hand and a right-hand mounting bracket and a left-hand and a right-hand deck lid hinge, the pivotal mounting means mounting the left-hand hinge to the left-hand bracket and the right-hand hinge to the right-hand bracket.

5. The convertible top apparatus as claimed in claim 4 wherein the frame assembly includes a left-hand and a right-hand rearward rail, a left-hand and a right-hand control arm and wherein the means for mounting the top frame assembly to the automobile include means for connecting the rearward rails to said deck lid mounting brackets for pivotal movement about said transverse deck lid pivotal axis and include means defining a first, arcuate slot in each of the left-hand and right-hand deck lid hinges and means defining a second, arcuate slot in each of the left-hand and right-hand mounting brackets, both of the first and both of the second slots having the same slot width and being located at the same radius from the transverse deck lid pivotal axis and being positioned so that rearward ends of the respective first slots overlap forward ends of the respective second slots by about one slot width when the deck lid is in the closed position and so that the respective first slots substantially overlap the respective second slots when the deck lid is in the open position, the means for mounting the frame assembly to the automobile further including a left-hand pivot pin extending through both the respective first and second slots of the left-hand deck lid hinge and the left-hand mounting bracket and a right-hand pivot pin extending through both the respective first and second slots of the right hand deck lid hinge and the right-hand mounting bracket and including means for connecting a rearward end region of the left-hand control arm to the left-hand pivot pin and for connecting rearward end regions of the right-hand control arm to the right-hand pivot pin, the pivot pins defining a transverse control arm pivot axis.

6. The convertible top apparatus as claimed in claim 5 wherein the frame assembly includes a transverse main top bow and means for pivotally connecting a lower left-hand end of said body bow to the left-hand control arm forwardly, when extended, of the left-hand pivot pin and for pivotally connecting the lower right-hand end of said bow to the right-hand control arm forwardly, when extended, of the right-hand pivot pin, an axis through the left-hand and right-hand connection points between the bow and the control arms defining a transverse, main bow pivotal axis.

7. The convertible top apparatus as claimed in claim 1 wherein the convertible top frame assembly includes a transverse shelf member, the forward regions of which are connected to the rear deck pivotal mounting means, rearward regions of the convertible top being connected to rearward regions of said member.

8. Convertible top apparatus for midengine automobiles having a forwardly extending engine compartment access opening and a forwardly extending rear deck lid for covering said opening, the convertible top apparatus comprising:
(a) a convertible top frame assembly configured for being foldable from an extended condition to a collapsed condition and unfoldable from the collapsed condition to the extended condition;
(b) a pliable convertible top covering configured for fitting over the top frame assembly when said assembly is in the extended condition, the top covering being connected to the frame assembly; and
(c) first means for pivotally mounting forward regions of the rear deck lid to the automobile for pivotal movement of the deck lid about a transverse fixed hinge axis between a closed condition in which the engine compartment access opening is closed and an open position in which said opening is uncovered, and
(d) lost motion connection means for mounting the top frame assembly to said means for pivotally mounting enabling concurrent pivotal motion of the deck lid and retention of the respective condition of the frame assembly.

9. The convertible top apparatus as claimed in claim 8 wherein the top frame assembly includes a left-hand control arm, a right-hand control arm and a generally U-shaped tack bow, and wherein said mounting means comprise a left-hand hinge bracket and a right-hand hinge bracket located forwardly of the engine compartment access opening, a left-hand deck lid hinge, a right-hand deck lid hinge, means for pivotally connecting, along said transverse fixed hinge axes, the left-hand hinge to the left-hand bracket and the right-hand hinge to the right-hand bracket, the deck lid being connected to the deck lid hinges, means for pivotally and slidably connecting the left-hand control arm to both the left-hand hinge and hinge bracket and the right-hand control arm to both the right-hand hinge and hinge bracket and means for pivotally connecting the tack bow between the control arms so as to cause the tack bow to move to a folded position when the frame assembly is folded to the collapsed condition.

10. The convertible top apparatus as claimed in claim 9 wherein the means for pivotally and slidably connecting the left-hand control arm to both the left-hand hinge and hinge bracket comprises means defining an arcuate, first left-hand slot in the left-hand hinge and an arcuate second left-hand slot in the left-hand hinge bracket, both of said first and second left-hand slots having substantially the same width, being located the same radius from the main hinge axis and having overlapping regions when the deck lid is in the opened and closed positions and all positions intermediate thereto, and including a left-hand, control arm pivot pin transversely installed through the overlapping regions of both the first and second left-hand slots, said left hand pivot pin being attached to the left-hand control arm and
wherein the means for pivotally and slidably connecting the right-hand control arm to both the right-hand hinge and hinge bracket comprises means which is the mirror image of the means for pivotally and slidably connecting the left-hand control arm to both the left-hand hinge and hinge bracket.

11. The convertible top apparatus as claimed in claim 10
wherein the first and second left-hand slots are configured so as to cause, when the deck lid is in the closed position, the left-hand control arm pivot pin to be non-slidably confined between a rearward end of the first left-hand slot and a forward end of the second left-hand slot, and
wherein the means for pivotally and slidably connecting the right-hand control arm to both the right-hand hinge and hinge bracket comprises means which is the mirror image of the means for pivotally and slidably connecting the left-hand control arm to both the left-hand hinge and hinge bracket.

12. The convertible top apparatus as claimed in claim 11 wherein when the deck lid is in the closed position, the left-hand control arm pivot pin and the right-hand control arm pivot pin define a transverse, control arm pivotal axis.

13. The convertible top apparatus as claimed in claim 11 wherein the first and second left-hand slots are located and configured so as to cause said left-hand slots to substantially overlap one another when the deck lid is in the open position, the left-hand control arm pivot pin being thereby enabled to slide along said overlapped left-hand slots when the frame assembly is moved between the collapsed and extended conditions and wherein the means for pivotally and slidably connecting the right-hand control arm to both the right-hand hinge and hinge bracket comprises means which is the mirror image of the means for pivotally and slidably connecting the left-hand control arm to both the left-hand hinge and hinge bracket.

14. The convertible top apparatus as claimed in claim 11 wherein the first and second left-hand slots are located and configured so as to cause said left-hand slots to substantially overlap one another when the deck lid is in the open position,
(a) thereby enabling the left-hand control arm pivot pin to remain stationary, and the first left-hand slot to move, when the frame assembly is in the collapsed condition and as the deck lid is pivoted between the closed and open positions, and (b) thereby further enabling forward pivoting of the collapsed frame assembly without the unfolding thereof and wherein the means for pivotally and slidably connecting the right-hand control arm to both the right-hand hinge and hinge bracket comprises means which is the mirror image of the means for pivotally and slidably connecting the left-hand control arm to both the left-hand hinge and hinge bracket.

15. The convertible top apparatus claimed in claim 13 wherein when the frame assembly is in the collapsed condition and the deck lid is pivoted from the closed position to the open position, the left-hand control arm pivot pin slides rearwardly and upwardly in the second left-hand slot and wherein the means for pivotally and slidably connecting the right-hand control arm to both the right-hand hinge and hinge bracket comprises means which is the mirror image of the means for pivotally and slidably connecting the left-hand control arm to both the left-hand hinge and hinge bracket in a manner enabling the frame assembly to remain in the collapsed condition against the deck lid.

16. The convertible top apparatus as claimed in claim 11 wherein the top frame assembly includes a transverse shelf member connected at forward regions to said left-hand and right-hand hinges so as to cause the shelf member to pivot about said transverse, fixed hinge axis in unison with the deck lid as the deck lid is pivoted between the open and closed positions.

17. The convertible top apparatus as claimed in claim 16 wherein rearward edge regions of the convertible top are attached to rearward regions of the shelf member, the shelf member being configured and attached to the deck lid hinges so as to cause lower, rearward regions of the shelf member to rest upon upper regions of the deck lid rearwardly of the transverse fixed hinge axis.

18. The convertible top apparatus as claimed in claim 9 wherein the top frame assembly includes left-hand forward and rearward rails and right-hand forward and rearward rails, a rearward end of the left-hand rearward rail being connected at the left-hand deck lid hinge for pivoting about said transverse fixed hinge axis and a rearward end of the right-hand rearward rail being connected at the right-hand deck lid hinge for pivoting about the said transverse fixed hinge axis and including means pivotally interconnecting the left-hand forward and rearward rails and pivotally interconnecting the right-hand forward and rearward rails so as to cause the left-hand forward rail to pivot relative to the left-hand rearward rail and the right-hand forward rail to pivot relative to the right-hand rearward rail when the top assembly is folded from the extended condition to the collapsed condition.

19. The convertible top assembly as claimed in claim 18 wherein the means pivotally interconnecting the left-hand forward and rearward rails include a left-hand rearward control link and a left-hand forward control link and the means pivotally interconnecting the right-hand forward and rearward rails include a right-hand rearward control link and a right-hand forward control link.

20. The convertible top assembly as claimed in claim 19 wherein the left-hand rearward control link is pivotally connected to the left-hand control arm and the right-hand rearward control link is pivotally connected to the right-hand control arm.

* * * * *